United States Patent
Arnold et al.

(10) Patent No.: US 11,956,292 B2
(45) Date of Patent: Apr. 9, 2024

(54) LEGACY ENVIRONMENT STREAMING

(71) Applicant: Rocket Software, Inc., Waltham, MA (US)

(72) Inventors: Michael E. Arnold, Greensboro, NC (US); Rodney Dyson, Hamilton, VA (US); Senthil Balasundaram, Bangalore (IN); Parveen Mehta, Ashburn, VA (US)

(73) Assignee: Rocket Software, Inc., Waltham, MA (US)

( * ) Notice: Subject to any disclaimer, the term of this patent is extended or adjusted under 35 U.S.C. 154(b) by 0 days.

(21) Appl. No.: 18/137,851

(22) Filed: Apr. 21, 2023

(65) Prior Publication Data

US 2023/0344885 A1 Oct. 26, 2023

Related U.S. Application Data

(60) Provisional application No. 63/334,157, filed on Apr. 24, 2022.

(51) Int. Cl.
*H04L 65/60* (2022.01)

(52) U.S. Cl.
CPC .................................. *H04L 65/60* (2013.01)

(58) Field of Classification Search
None
See application file for complete search history.

(56) References Cited

U.S. PATENT DOCUMENTS

| | | | | |
|---|---|---|---|---|
| 2021/0385290 A1* | 12/2021 | Edamadaka | ............ | H04L 67/63 |
| 2021/0392047 A1* | 12/2021 | Jamkhedkar | .......... | H04L 41/145 |
| 2022/0138182 A1* | 5/2022 | Yang | ................... | G06F 16/2379 707/703 |
| 2022/0224660 A1* | 7/2022 | Patel | ..................... | H04L 51/043 |

OTHER PUBLICATIONS

Lin et al., "A Programmable and Reliable Publish/Subscribe System for Multi-Tier IoT", Dec. 6, 2021, IEEE, 2021 8th International Conference on Internet of Things: Systems, Management and Security (IOTSMS) (pp. 1-8) (Year: 2021).*

* cited by examiner

*Primary Examiner* — Davoud A Zand
(74) *Attorney, Agent, or Firm* — Danielson Legal LLC

(57) ABSTRACT

Systems and methods for streaming data in a legacy mainframe environment. In some embodiments, the method includes receiving, at a KAFKA streaming platform abstraction layer interface, production data from a first publisher application; selecting a producer instance to receive the production data; and configuring the selected producer instance with a first set of configuration parameters from at least one producer library. The method may further include communicating the first publication data to the selected producer instance; and forwarding the first publication data to a KAFKA streaming platform cluster in operable communication with a consumer instance.

20 Claims, 5 Drawing Sheets

LEGACY ENVIRONMENT STREAMING

CROSS REFERENCE TO RELATED APPLICATIONS

The present application claims the benefit of and priority to U.S. provisional application No. 63/334,157, filed on Apr. 24, 2022, the content of which is hereby incorporated by reference as if set forth in its entirety herein.

TECHNICAL FIELD

Embodiments described herein generally relate to systems and methods for transmitting data and, more particularly but not exclusively, to systems and methods for streaming data to or from mainframe environments.

BACKGROUND

Mainframe computing environments and other types of legacy computing systems are still widely used by organizations. These organizations may have defined processes to ingest, process, visualize, and analyze data from various sources. These sources are often outside of an organization's mainframe environment. An organization may need to make data associated with mainframe environments accessible to external data streaming pipelines and vice versa.

Data streaming or processing pipelines generally exist outside of a mainframe environment for a variety of reasons. These reasons may include, but are not limited to computation costs, the availability of tools for the mainframe platform, etc. However, mainframe and legacy computing systems continue to remain as core platforms for many organizations.

There is generally a lack of client libraries for streaming that are native to mainframe environments. The lack of data streaming libraries requires complicated and inefficient methodologies for streaming data to and from mainframe environments. For example, publishing data from a mainframe-native application to a streaming data service like APACHE KAFKA involves middleware and a connection mechanism to add data to a KAFKA stream. This connector may be a Java-based implementation in Unix System Services, for example. This adds an additional level of complexity or latency to the stream.

A need exists, therefore, for systems and methods that overcome the disadvantages associated with existing streaming techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method for streaming data in a legacy mainframe environment. The method includes receiving, at a KAFKA streaming platform abstraction layer interface, production data from a first publisher application; selecting a producer instance to receive the production data; configuring the selected producer instance with a first set of configuration parameters from at least one producer library; communicating the first publication data to the selected producer instance; and forwarding the first publication data to a KAFKA streaming platform cluster in operable communication with a consumer instance.

In some embodiments, the selected producer instance operates in accord with a first encoding scheme, the consumer instance operates in accord with a second encoding scheme that is different than the first encoding scheme, and the method further includes executing an encoding translation procedure to transcode the production data from the first encoding scheme to the second encoding scheme.

In some embodiments, communicating the first publication data includes establishing a queue associated with the selected producer instance, placing the first publication data in the established queue, and communicating the first publication data from the established queue to the selected producer instance in a priority-based order.

In some embodiments, the method further includes executing a serialization procedure to transform the publication data to a serialized format before communicating the publication data to the selected producer instance.

In some embodiments, configuring the selected producer instance with the first set of configuration parameters includes receiving at least one instance-specific configuration parameter from an instance-specific repository and updating the selected producer instance in accord with the at least one instance-specific configuration parameter.

In some embodiments, configuring the selected producer instance with the first set of configuration parameters includes receiving at least one global configuration parameter from a global configuration repository, and updating the selected producer instance in accord with the at least one global configuration parameter, wherein the at least one global configuration parameter is applicable to a plurality of producer instances and is selected from the group consisting of broker internet protocol (IP) address and port configuration data.

In some embodiments, the method further includes forwarding the publication data to a first consumer application. In some embodiments, the method further includes executing a deserialization procedure to deserialize the publication data before forwarding the publication data to the first consumer application.

According to another aspect, embodiments relate to a method for streaming data in a legacy mainframe environment. The method includes receiving at an interface a subscription request from a first consumer application; selecting a consumer instance to provide production data to the first consumer application; configuring the selected consumer instance with a first set of configuration parameters from at least one consumer library; receiving at the consumer instance the production data from a KAFKA streaming platform cluster; and forwarding the production data to the first consumer application.

In some embodiments, receiving the subscription request includes registering a call back routine with the selected consumer instance.

In some embodiments, the method further includes executing a deserialization procedure to deserialize the production data before forwarding the production data to the first consumer application. In some embodiments, the method further includes establishing a queue associated with the first selected consumer instance, placing the production data in the established queue, and communicating the production data from the queue to the selected consumer instance in a priority-based order.

In some embodiments, configuring the selected consumer instance with the first set of configuration parameters includes receiving at least one instance-specific configuration parameter from an instance-specific repository and updating the selected consumer instance in accord with the at least one instance-specific configuration parameter.

In some embodiments, configuring the selected consumer instance with the first set of configuration parameters includes receiving at least one global configuration parameter from a global configuration repository and updating the selected producer instance in accord with the at least one global configuration parameter, wherein the at least one global configuration parameter is applicable to a plurality of consumer instances and is selected from the group consisting of broker internet protocol (IP) address and port data.

According to yet another aspect, embodiments relate to a system for streaming data in a legacy mainframe environment. The system includes a KAFKA streaming platform abstraction layer interface in communication with a first publisher application; at least one producer instance configured in accord with a configuration parameter from at least one producer configuration library, wherein the KAFKA streaming platform abstraction layer interface selects a producer instance to receive publication data from the first publisher application; at least one consumer instance configured in accord with a configuration parameter from at least one consumer configuration library; and a KAFKA streaming platform client layer interface configured to forward the publication data from the selected producer instance to a KAFKA streaming platform cluster and forward consumer data based on the publication data from the KAFKA streaming platform cluster to the consumer instance, wherein the consumer instance is configured to communicate the consumer data to a first consumer application.

In some embodiments, the first publisher application operates in accordance with a first encoding scheme, the first consumer application operates in accord with a second encoding scheme that is different than the first encoding scheme, and the system further includes a translation module configured to execute an encoding translation procedure to transcode the production data from the first encoding scheme to the second encoding scheme. In some embodiments, the KAFKA streaming platform abstraction layer interface is further configured to perform a serialization procedure to transform the publication data to a serialized format before communicating the publication data to the selected producer instance. In some embodiments, the KAFKA streaming platform abstraction layer interface is further configured to perform a deserialization procedure to deserialize the consumer data before communicating the consumer data to the first consumer application.

In some embodiments, the system further includes a global configuration repository storing configuration parameters applicable to a plurality of producer instances or a plurality of consumer instances.

In some embodiments, the system further includes an instance-specific repository storing configuration parameters applicable to a specific producer instance or a specific consumer instance.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
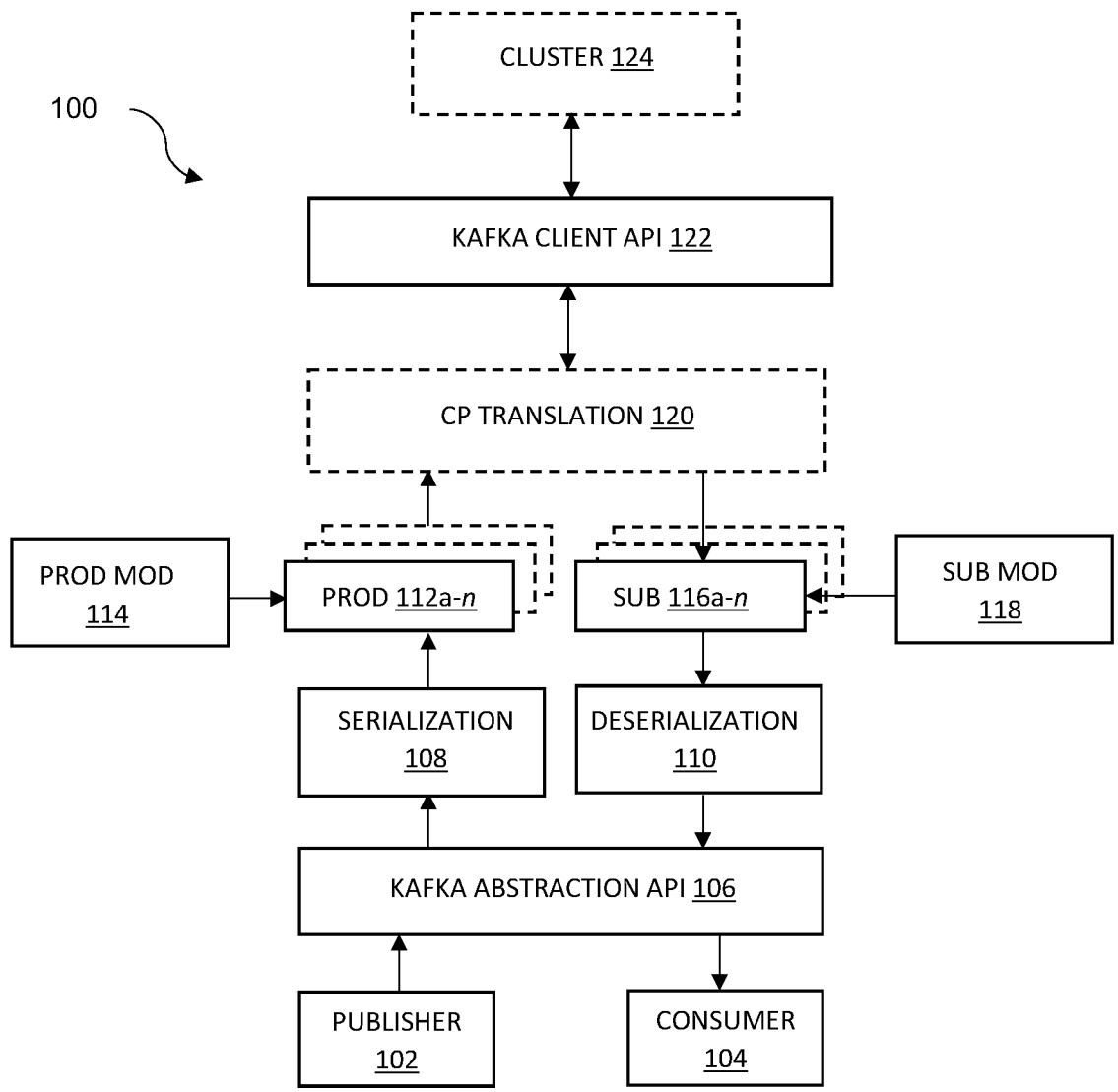
FIG. 1 illustrates a system for streaming data in a mainframe environment in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As discussed above, currently available techniques for streaming data between mainframe environments and environments outside of the mainframe environment are cumbersome and inefficient.

The embodiments herein provide novel techniques for streaming data to and from mainframe applications. This includes data originating from a publisher within the mainframe environment and being transmitted to one or more consumers external to the mainframe environment; data originating from a publisher within a mainframe environment and being transmitted to one or more consumers within the mainframe environment; and data originating from a publisher external to a mainframe environment and being transmitted to one or more consumers within the mainframe environment.

In the context of the present application, a "consumer" or "consumer application" may refer to an entity that receives the messages or data generated by a publisher or publisher application. The consumer or consumer application may receive this streamed data over a KAFKA model.

In connection with the KAFKA models described herein, a "topic" refers to a group or categorization of messages. In operation, a consumer subscribes to a particular topic and receives messages when a publisher posts messages to the topic. For example, a publisher may be a sports provider that publishes streaming data concerning a live sporting event. In this case, a subscriber may be a sports fan interested in viewing the streaming published data for the event.

FIG. 1 illustrates a system 100 for streaming data in a mainframe environment in accordance with one embodiment. The system 100 may include or otherwise involve a publisher 102 and a consumer 104.

In the context of the present application, the "publisher 102" or "publisher application" may refer to an entity (e.g., a program, person, company, organization, broadcaster) that generates messages or other data to be streamed to one or more consumers 104. Specifically, these terms may refer to an entity that generates streaming data to be sent over a KAFKA model.

In the context of the present application, the term "consumer 104" or "consumer application" may refer to an entity that receives the messages or data generated by a publisher or publisher application. The consumer or consumer application may receive this streamed data over a KAFKA model.

The KAFKA abstraction API 106 communicates the data from the publisher 102 to a serialization module 108 to perform a serialization procedure. For example, the serialization procedure may transform the data from the publisher 102 into a JavaScript Object Notation (JSON) format.

Once any required serialization procedure(s) are performed by the serialization module 108, the data may be communicated to one or more producer instances 112a, 112b, . . . , 112n, where n is the number of producer instances. Each producer instance 112a-n may be associated with a particular topic, for example. For example, the publisher 102 may assign a particular tag, label, or identifier (for simplicity, "identifier") to the published data, wherein the identifier indicates to which producer instance 112a-n the data is sent. The KAFKA abstraction API 106 may reference any assigned identifiers to select the appropriate producer instance 112a-n.

Figure 2:
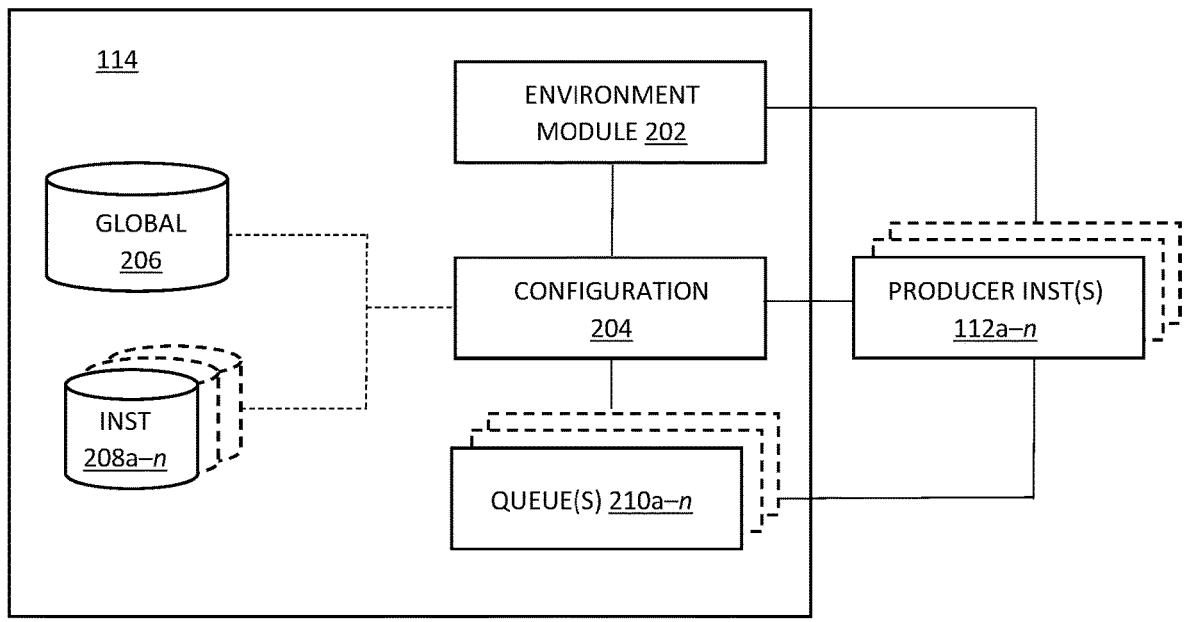
FIG. 2 illustrates the producer module of FIG. 1 in accordance with one embodiment.

Each producer instance 112a-n may be configured with a different set of throughput parameters as specified by a producer module 114. These may be KAFKA throughput parameters, for example. FIG. 2 illustrates the producer module 114 instantiating the producer instances 112a-n of FIG. 1 in accordance with one embodiment. An environment module 202 may instantiate a new, native environment for each new producer instance 112a-n. For example, each new environment may be configured with any required initialization parameters and error handlers.

A configuration module 204 may configure one or more of the producer instances 112a-n based on configuration details from a global configuration repository 206, an instance-specific repository 208a-n, or from both.

The global configuration repository 206 may store data configuration parameters applicable to a plurality of the producer instances 112a-n. Global configuration parameters may include details such as broker internet protocol (IP) addresses, port details such as which ports are to be used for data transmission, etc. If more than one producer instance 112a-n publishes data to the same destination, a destination IP address for the producer instances 112a-n would be specified as a global configuration parameter.

The instance-specific repository 208a-n may store data specific configuration parameters for each of the producer instances 112a-n. For example, instance-specific repository 208a may store configuration parameters specific to producer instance 112a; repository 208b, producer instance 112b; and repository 208n, producer instance 112n.

Instance-specific configuration parameters may include, for example, throughput parameters for a specific producer instance 112a-n. These may include, but are not limited to, topics, buffer sizes, producer frequency, or the like. The above-described parameters may be specified by a user, for example.

The producer module 114 may also create dedicated request queues 210a-n. These queues 210a-n may help account for "backpressure" situations, in which a producer instance 112a-n produces data at a rate that is too fast for a consumer instance (not shown in FIG. 2) to consume. Accordingly, the producer module 114 may store data from each producer instance 112a-n in a respective queue 210a-n. That is, data from producer instance 112a may be stored in queue 210a; producer instance 108b, queue 210b; and so on. The queues 210a-n may provide a cross memory interface and store data in a first in, first out (FIFO) or some other type of priority-based procedure.

The queues 210a-n allow a producer instance 108a-n to continuously produce and publish data without needing to wait until published data reaches its destination. Accordingly, a producer instance 112a-n may publish data and a subscriber may receive data in an asynchronous fashion.

Referring back to FIG. 1, the producer instances 112a-n may communicate the published data to a code page (CP) translation module 120. Oftentimes a code page associated with streaming data may be unique to a first environment (e.g., an environment associated with producer instance 112a), and would not be understandable by another platform. For example, a first platform or a device thereon may store data in accord with the Extended Binary Coded Decimal Interchange Code (EBCDIC) standard, and a second platform may use the Unicode Transformation (UTF) encoding standard.

Figure 3:
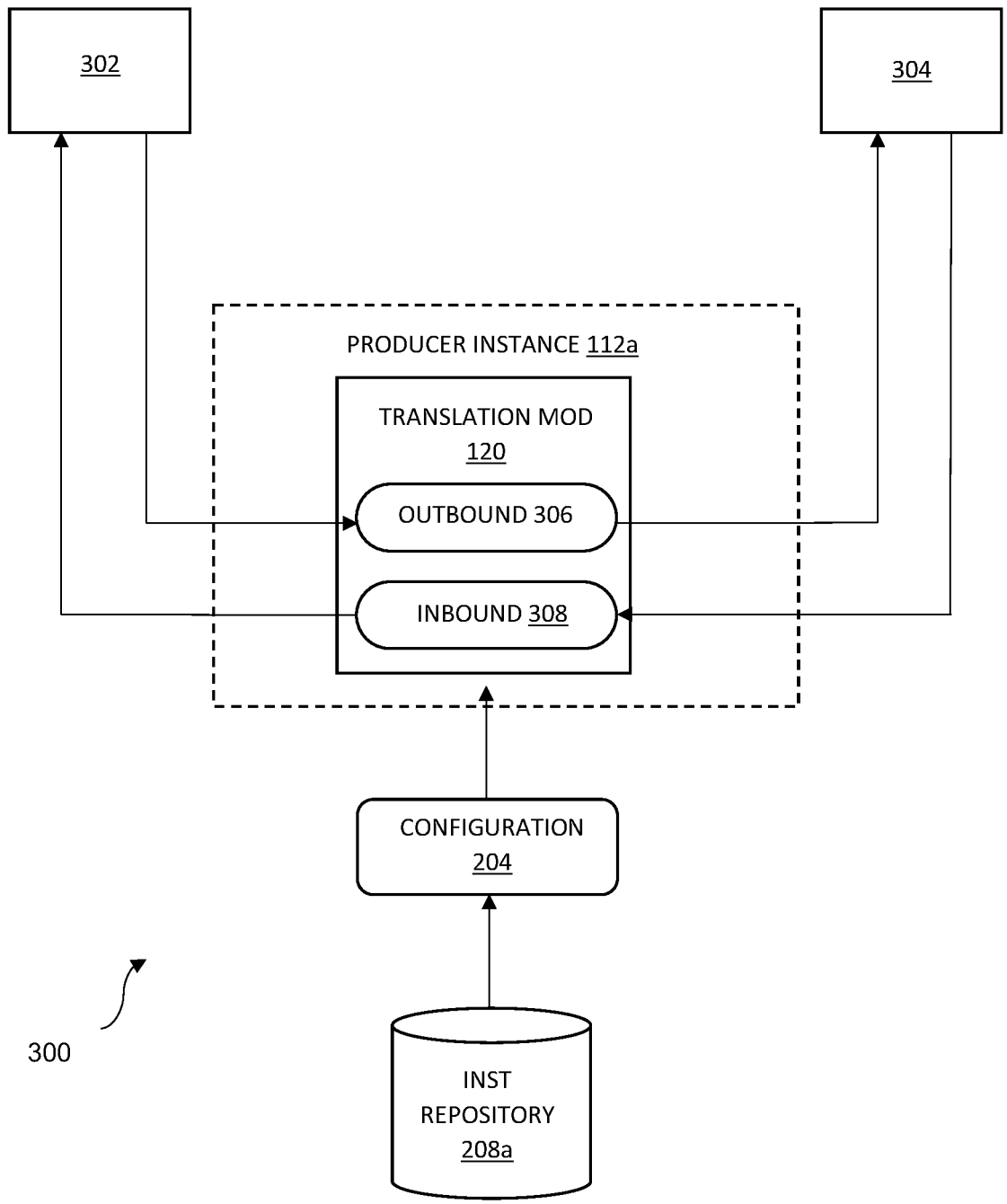
FIG. 3 illustrates a code page translation process in accordance with one embodiment.

FIG. 3 illustrates a code page translation process 300 in accordance with one embodiment. Not all applications will require code page translation, however. The process 300 is illustrated in the context of the producer instance 112a of FIGS. 1 & 2. However, the process 300 is applicable to other producer instances 112b-n or subscriber instances 116a-n as well.

A first computing device 302 or platform may be transmitting data to a second computing device 304 or platform. This may be referred to as an outbound communication. Additionally or alternatively, the second computing device 304 may be transmitting data to the first computing device 302. This may be referred to as an inbound communication.

Most personal computer architectures represent characters as numbers using the American Standard Code for Information Interchange (ASCII) standard. The use of a common character encoding standard facilitates communications between devices made by different manufacturers. However, many mainframe and legacy computing systems use encoding standards that predate the establishment of ASCII, such as EBCDIC. Accordingly, the first computing device 302 and the second computing device 304 may represent characters in accord with different encoding standards.

When the producer instance 112a is created, the configuration module 204 loads or otherwise references data from the instance-specific repository 208a regarding the character encoding scheme supported by the producer instance 112a. The configuration module 204 creates the translation module 120 in the producer instance 112a to transcode outbound communications and inbound communications. Although the translation module 120 is illustrated as part of the producer instance 112a, the translation module 120 may be a separate component (e.g., as in FIG. 1) and may be configured to process traffic associated with any number of producer instances, subscriber instances, or both.

The producer instance 112a may translate between the different encoding standards supported by the first computing device 302 and the second computing device 304. Outbound communications may be translated using an outbound translation table 306. Inbound communications may be translated using an inbound translation table 308.

The embodiments described herein extend data streaming services between these computing devices or platforms that implement different encoding standards and offer transparent code page translation to facilitate cross-platform or cross-device communications. As discussed previously, the configuration module 204 of FIG. 2 may configure a producer instance 112a in accord with one or more configuration parameters stored in the instance-specific repository 208.

Referring back to FIG. 1, data from the producer instance 112a (i.e., a producer record) may be communicated to a KAFKA client API 122. The KAFKA client API may be a thread safe, platform-native implementation of KAFKA client functions such as producer-, consumer-, and admin-related functions. The KAFKA client API 122 may further include a KAFKA producer API and a KAFKA subscriber API. The KAFKA producer API may send the producer record to the appropriate KAFKA cluster 124. For example, the KAFKA cluster 124 may be associated with a topic of interest.

The system 100 may further include security mechanisms for protecting data as it is being sent to and from the cluster 124. For example, the KAFKA client API 122 may execute a Simple Authentication and Security Layer (SASL) or a secure sockets layer (SSL) procedure to establish an encrypted communication link between the KAFKA client API 122 and the cluster 124. The system 100 may also implement any appropriate authentication procedures to ensure only authorized personnel or entities are able to publish data or receive published data.

The data may then be directed back through the system 100 to reach the consumer 104. For example, a consumer 104 may subscribe to a topic of interest by registering a call back routine to an appropriate subscriber instance 116a-n. For example, a unique instance identifier of a subscriber instance 116a-n may assist in identifying an appropriate subscriber instance for a sub scriber or sub scriber application.

A subscriber instance 116a-n may poll the KAFKA cluster 124 corresponding to an applicable topic via the KAFKA client API 122. On arrival at the abstraction KAFKA client API 122, the data is translated by the translation module 120 (if necessary) and forwarded by an appropriate subscriber instance (e.g., subscriber instance 116a) to the deserialization module 110. The deserialization module 110 may be specifically chosen by the subscriber instance 116a. For example, the data may be a JSON payload that is deserialized by the deserialization module 110.

The deserialized messages may then be placed in a queue associated with a consumer 104. As discussed previously, the subscriber module 118 may be similar to the producer module 114 and include similar components to initiate subscriber instances 116a-n. For example, the subscriber module 118 may include a global configuration repository, instance-specific repository, queue(s), etc. such as those discussed in conjunction with FIG. 2.

Figure 4:
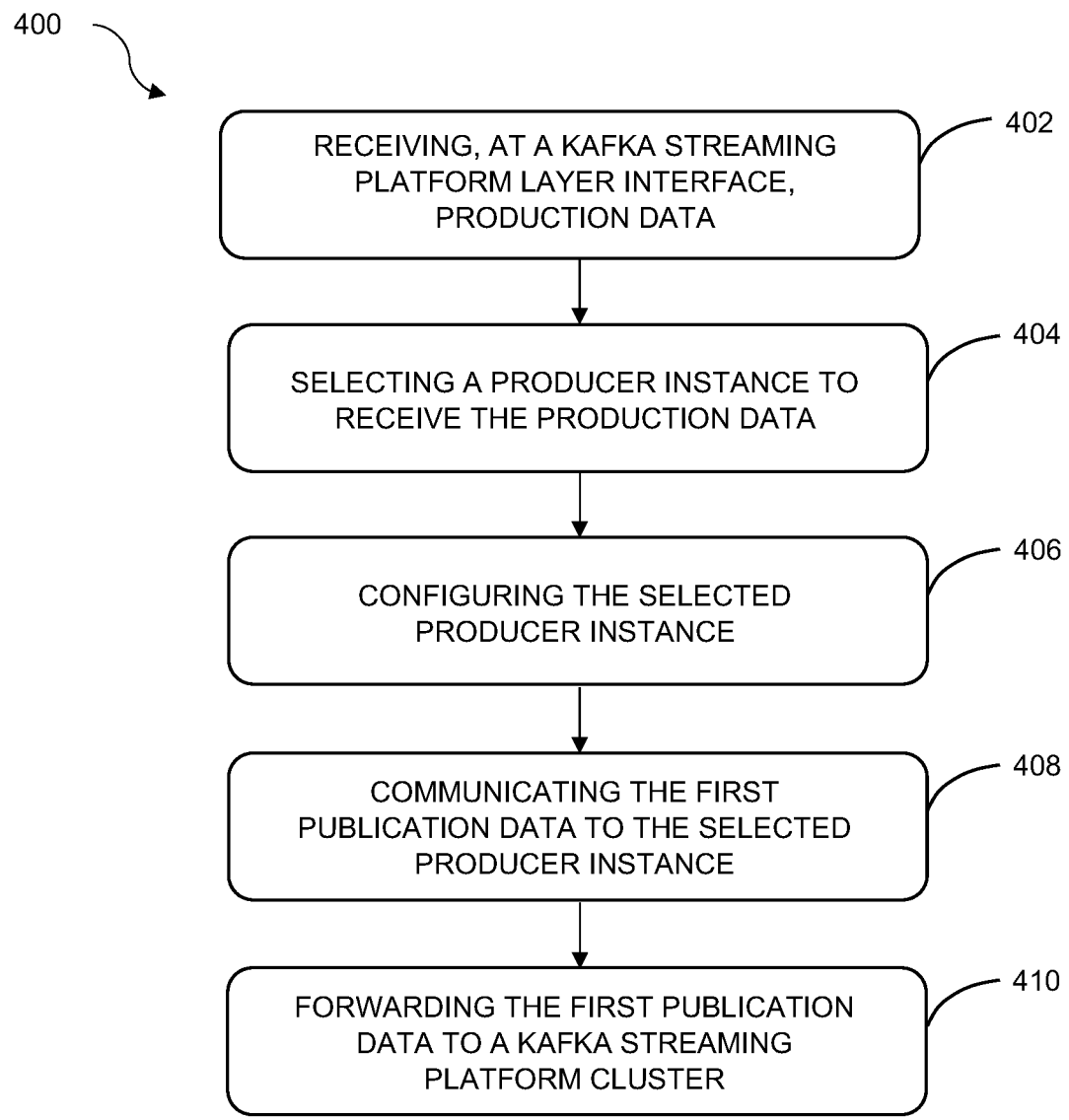
FIG. 4 depicts a flowchart of a method for streaming data in a legacy mainframe environment in accordance with one embodiment.

FIG. 4 depicts a flowchart of a method 400 for streaming data in a legacy mainframe environment in accordance with one embodiment. The system 100 or components thereof may perform the steps of method 400.

Step 402 involves receiving, at a KAFKA streaming platform abstraction layer interface, production data from a first publisher application. The KAFKA streaming platform may be similar to the KAFKA abstraction API 106 of FIG. 1, for example.

Step 404 involves selecting a producer instance to receive the production data. The selected producer instance may operate in accord with or otherwise be supported by a first encoding scheme. Additionally, the selected producer instance may be associated with a particular topic.

Step 406 involves configuring the selected producer instance with a first set of configuration parameters from at least one producer library. The configuration parameters may be global parameters that are applicable to several producer instances, instance-specific parameters that are specific to the selected producer instance, or some combination thereof. Global configuration parameters may include broker IP addresses or port configuration data, for example.

Step 408 involves communicating the first publication data to the selected producer instance. Step 408 may involve establishing a queue associated with the selected producer instance, and placing the first publication data in the established queue. The first publication data may be communicated from the established queue to the selected producer instance in a priority-based order.

Step 410 involves forwarding the first publication data to a KAFKA streaming platform cluster in operable communication with a consumer instance. Step 410 may further involve forwarding the production data to the first consumer application. This may also involve executing a deserialization procedure to deserialize the publication data before forwarding the publication data to the first consumer application.

The consumer instance may operate in accord with or otherwise be supported by a second encoding scheme that is different than the first encoding scheme. In these embodiments, method 400 may further include a step of executing an encoding translation procedure to transcode production data from the first encoding scheme to the second encoding scheme.

Figure 5:
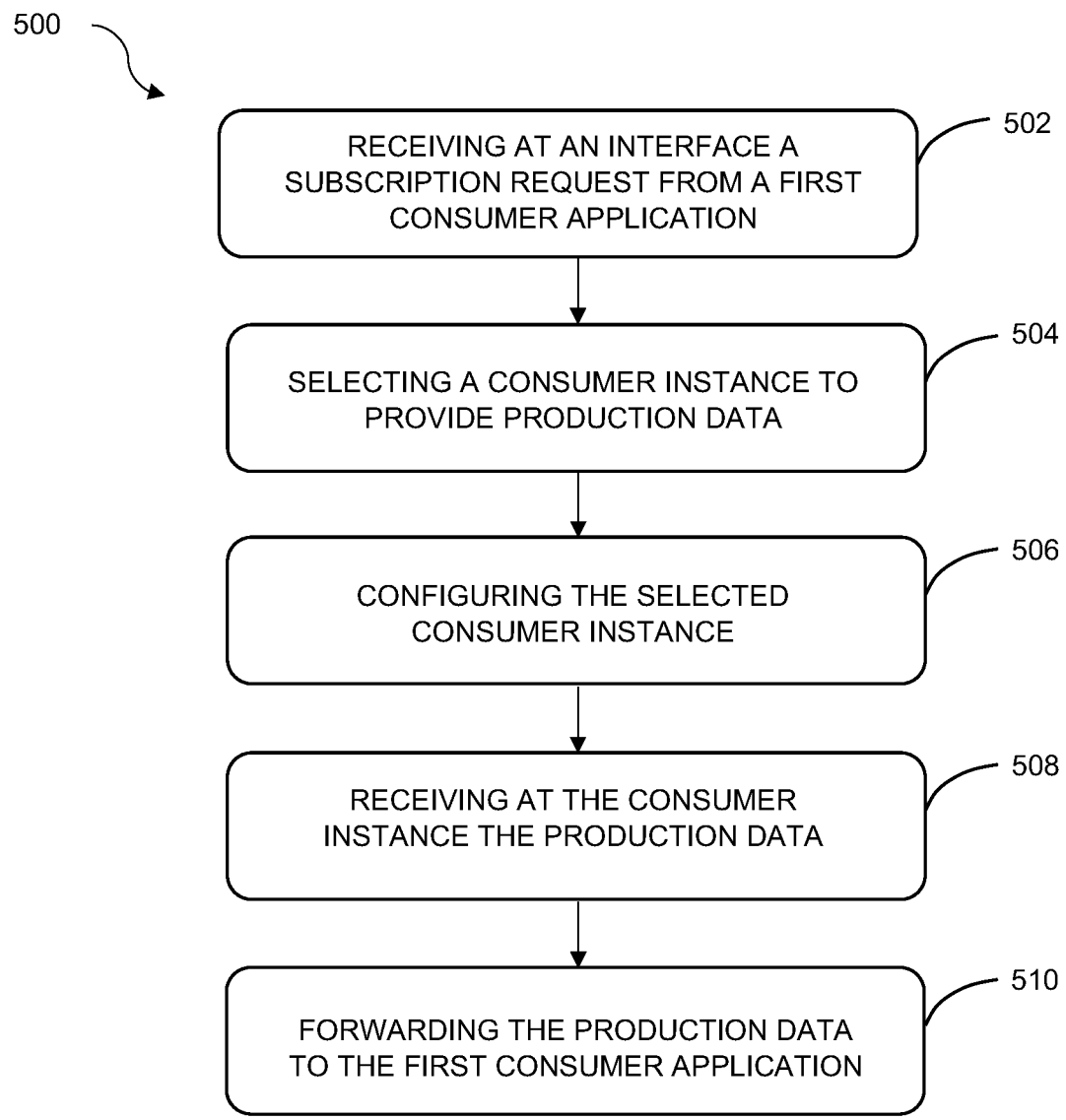
FIG. 5 depicts a flowchart of a method for streaming data in a legacy mainframe environment in accordance with another embodiment.

FIG. 5 depicts a flowchart of a method 500 for streaming data in a legacy mainframe environment. The system 100 or components thereof may perform the steps of method 500.

Step 502 involves receiving at an interface a subscription request from a first consumer application. The consumer application may be associated with a consumer such as consumer 104 of FIG. 1. The consumer may execute a callback function to receive data associated with a particular topic of interest.

Step 504 involves selecting a consumer instance to provide production data to the first consumer application. The production data may have been provided by a particular publisher such as publisher 102 of FIG. 1.

Step 506 involves configuring the selected consumer instance with a first set of configuration parameters from at least one consumer library. The configuration parameters may be global parameters that are applicable to several consumer instances, instance-specific parameters that are specific to the selected consumer instance, or some combination thereof.

Step 508 involves receiving at the consumer instance the production data from a KAFKA streaming platform cluster. The cluster may be similar to the cluster 124 of FIG. 1, for example. The consumer instance may be associated with a particular topic, such as the topic of the production data.

Step 510 involves forwarding the production data to the first consumer application. This step may also involve any required translation or deserialization procedures. The first consumer application may be executing on a user device associated with a subscriber such as the consumer 104 of FIG. 1. The subscriber may have previously subscribed to the topic associated with the production data.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for streaming data in a legacy mainframe environment, the method comprising:
   receiving, at a KAFKA streaming platform abstraction layer interface, production data from a first publisher application;
   selecting a producer instance to receive the production data;
   configuring the selected producer instance with a first set of configuration parameters from at least one producer library;
   communicating the first publication data to the selected producer instance; and
   forwarding the first publication data to a KAFKA streaming platform cluster in operable communication with a consumer instance.

2. The method of claim 1 wherein:
   the selected producer instance operates in accord with a first encoding scheme,
   the consumer instance operates in accord with a second encoding scheme that is different than the first encoding scheme, and
   the method further includes executing an encoding translation procedure to transcode the production data from the first encoding scheme to the second encoding scheme.

3. The method of claim 1 wherein communicating the first publication data includes:
   establishing a queue associated with the selected producer instance,
   placing the first publication data in the established queue, and
   communicating the first publication data from the established queue to the selected producer instance in a priority-based order.

4. The method of claim 1 further comprising executing a serialization procedure to transform the publication data to a serialized format before communicating the publication data to the selected producer instance.

5. The method of claim 1 wherein configuring the selected producer instance with the first set of configuration parameters includes:
   receiving at least one instance-specific configuration parameter from an instance-specific repository, and
   updating the selected producer instance in accord with the at least one instance-specific configuration parameter.

6. The method of claim 1 wherein configuring the selected producer instance with the first set of configuration parameters includes:
   receiving at least one global configuration parameter from a global configuration repository,
   updating the selected producer instance in accord with the at least one global configuration parameter,
   wherein the at least one global configuration parameter is applicable to a plurality of producer instances and is selected from the group consisting of broker internet protocol (IP) address and port configuration data.

7. The method of claim 1 further comprising forwarding the publication data to a first consumer application.

8. The method of claim 7 further comprising executing a deserialization procedure to deserialize the publication data before forwarding the publication data to the first consumer application.

9. A method for streaming data in a legacy mainframe environment, the method comprising:
   receiving at an interface a subscription request from a first consumer application;
   selecting a consumer instance to provide production data to the first consumer application;
   configuring the selected consumer instance with a first set of configuration parameters from at least one consumer library;
   receiving at the consumer instance the production data from a KAFKA streaming platform cluster; and
   forwarding the production data to the first consumer application.

10. The method of claim 9 wherein receiving the subscription request includes registering a call back routine with the selected consumer instance.

11. The method of claim 9 further comprising executing a deserialization procedure to deserialize the production data before forwarding the production data to the first consumer application.

12. The method of claim 11 further comprising:
    establishing a queue associated with the first selected consumer instance,
    placing the production data in the established queue, and
    communicating the production data from the queue to the selected consumer instance in a priority-based order.

13. The method of claim 9 wherein configuring the selected consumer instance with the first set of configuration parameters includes:
    receiving at least one instance-specific configuration parameter from an instance-specific repository, and
    updating the selected consumer instance in accord with the at least one instance-specific configuration parameter.

14. The method of claim 9 wherein configuring the selected consumer instance with the first set of configuration parameters includes:
    receiving at least one global configuration parameter from a global configuration repository,
    updating the selected producer instance in accord with the at least one global configuration parameter,
    wherein the at least one global configuration parameter is applicable to a plurality of consumer instances and is selected from the group consisting of broker internet protocol (IP) address and port data.

15. A system for streaming data in a legacy mainframe environment, the system comprising:
    a KAFKA streaming platform abstraction layer interface in communication with a first publisher application;
    at least one producer instance configured in accord with a configuration parameter from at least one producer configuration library, wherein the KAFKA streaming platform abstraction layer interface selects a producer instance to receive publication data from the first publisher application;
    at least one consumer instance configured in accord with a configuration parameter from at least one consumer configuration library, and
    a KAFKA streaming platform client layer interface configured to:
      forward the publication data from the selected producer instance to a KAFKA streaming platform cluster, and forward consumer data based on the publication data from the KAFKA streaming platform cluster to the consumer instance, wherein the consumer instance is configured to communicate the consumer data to a first consumer application.

16. The system of claim 15 wherein:

the first publisher application operates in accordance with a first encoding scheme, the first consumer application operates in accord with a second encoding scheme that is different than the first encoding scheme, and the system further includes a translation module configured to execute an encoding translation procedure to transcode the production data from the first encoding scheme to the second encoding scheme.

17. The system of claim 15 wherein the KAFKA streaming platform abstraction layer interface is further configured to perform a serialization procedure to transform the publication data to a serialized format before communicating the publication data to the selected producer instance.

18. The system of claim 17 wherein the KAFKA streaming platform abstraction layer interface is further configured to perform a deserialization procedure to deserialize the consumer data before communicating the consumer data to the first consumer application.

19. The system of claim 15 further comprising a global configuration repository storing configuration parameters applicable to a plurality of producer instances or a plurality of consumer instances.

20. The system of claim 15 further comprising an instance-specific repository storing configuration parameters applicable to a specific producer instance or a specific consumer instance.

* * * * *